(12) United States Patent
Sung et al.

(10) Patent No.: US 7,561,388 B2
(45) Date of Patent: Jul. 14, 2009

(54) FAIL-OPEN SURGE PROTECTION SYSTEM

(75) Inventors: Allen L. Sung, Unionville (CA); Todd Barbara, Marblehead, MA (US); Carlos Barberis, Haverhill, MA (US)

(73) Assignee: Ultralink Products, Inc., Markham, Ontario (CA)

( * ) Notice: Subject to any disclaimer, the term of this patent is extended or adjusted under 35 U.S.C. 154(b) by 264 days.

(21) Appl. No.: 11/149,567

(22) Filed: Jun. 10, 2005

(65) Prior Publication Data

US 2006/0279885 A1    Dec. 14, 2006

(51) Int. Cl.
*H02H 3/00*    (2006.01)
(52) U.S. Cl. ....................................................... 361/42
(58) Field of Classification Search ...................... 361/42
See application file for complete search history.

(56) References Cited

U.S. PATENT DOCUMENTS

| | | | | |
|---|---|---|---|---|
| 5,963,414 A * | 10/1999 | Bird | ............................ | 361/119 |
| 6,118,639 A * | 9/2000 | Goldstein | ..................... | 361/55 |
| 6,404,348 B1 * | 6/2002 | Wilfong | ..................... | 340/657 |
| 6,430,017 B1 * | 8/2002 | Finlay et al. | ................. | 361/104 |
| 6,477,025 B1 | 11/2002 | Goldbach et al. | ............ | 361/103 |
| 6,535,369 B1 * | 3/2003 | Redding et al. | .............. | 361/111 |
| 6,614,636 B1 | 9/2003 | Marsh | ......................... | 361/91.1 |
| 6,683,770 B1 | 1/2004 | Marsh | ......................... | 361/111 |
| 6,790,092 B2 * | 9/2004 | Parsadayan et al. | .......... | 439/650 |
| 6,816,352 B2 | 11/2004 | Hoopes | ....................... | 361/104 |
| 2005/0083628 A1* | 4/2005 | Holzenthal, Jr. | ............. | 361/118 |
| 2005/0088792 A1* | 4/2005 | Mechanic et al. | ........... | 361/91.1 |
| 2005/0146827 A1* | 7/2005 | Borden et al. | ................ | 361/118 |
| 2006/0134984 A1* | 6/2006 | Korsunsky et al. | ........... | 439/607 |

FOREIGN PATENT DOCUMENTS

EP            1267468        * 12/2002

* cited by examiner

*Primary Examiner*—Stephen W Jackson
(74) *Attorney, Agent, or Firm*—Fay Sharpe LLP

(57) ABSTRACT

A surge protection device for providing electrical power to electronic devices and protecting the electronic devices from voltage surges. The surge protection device includes a surge protection circuit for absorbing voltage spikes or surges and a switch for disconnecting the electronic devices from AC power when a component of the surge protection circuit fails. The surge protection circuit provides a voltage signal indicative of whether the component fails failed to a controller and the controller outputs a control signal to the switch to control operation of the switch. The surge protection circuit may be provided on a separate circuit board that is removably electrically coupled to a main circuit board so as to facilitate easy removal and replacement of the surge protection circuit upon failure of a component.

23 Claims, 6 Drawing Sheets

FAIL-OPEN SURGE PROTECTION SYSTEM

FIELD OF THE APPLICATION

The present application relates to surge protection for electronic devices and, in particular, to a fail-open surge protection system.

BACKGROUND

Surge protection devices are commonly used to protect electronic equipment from transient voltage surges or spikes in AC line power. Such spikes or surges may result from lighting strikes to the power grid, switching transients, and other anomalies within the power grid. Spikes or surges in voltage can be damaging to sensitive electronic equipment. Accordingly, consumers often use a surge protection circuit like a power strip to connect to a household AC power outlet, and plug equipment into AC outlets on the power strip.

Many surge protection devices employ metal-oxide varistors (MOVs) to absorb voltage spikes or surges above a threshold value. MOVs work by absorbing voltage spikes above a preset level and converting the excess energy into heat. The heat is dissipated by the MOV. The capacity of the MOV to absorb voltage spikes without excessive heating and consequent rupturing is limited. Repeated voltage spikes have a cumulative deleterious effect on the capacity of the MOV to absorb additional spikes without overheating. When an MOV overheats beyond its tolerance, it can rupture and burst.

To prevent the MOV from rupturing, electrical safety standards require the use of a corresponding thermal fuse designed to disconnect the MOV in the event that its temperature reaches a critical value. Accordingly, the thermal fuse may remove the MOV from the surge protection circuit to prevent it from bursting.

In many cases, surge protection circuits are designed such that when the thermal fuse opens the surge protection circuit is disabled, but AC power is still provided at the outputs. The failure of the thermal fuse may trigger an LED or may de-power an LED so as to indicate that a thermal fuse within the surge protection circuit has failed. In other words, on failure of the thermal fuse the surge protection feature is disabled and it becomes incumbent upon the user to disconnect electrical devices from the power strip and to repair or replace the power strip. Such power strips may be classified as "fail-closed" devices.

Line conditioner units that incorporate surge protection circuits are often used to protect valuable and sensitive electronic equipment, such as high-end home theater and stereo equipment. The line conditioner units provide appropriate filtering, smoothing, isolation, and other power conditioning features in addition to surge protection. As a result, such units are more expensive than simple power strips and consumers cannot be expected to replace the unit in the event that a component within a surge protection circuit fails.

It would be advantageous to provide for improved surge protection and to provide for an improved line conditioner unit having surge protection circuitry.

SUMMARY OF THE APPLICATION

The present application provides a surge protection device having a surge protection circuit for absorbing voltage surges, whereby the surge protection circuit disconnects line voltage from the output ports in the event that a component of the surge protection circuit fails. The surge protection device includes a controller that controls a switch connecting input power to the output ports. If the controller detects failure of a component in the surge protection circuit, then it causes the switch to disconnect power from the output ports.

In one embodiment, the surge protection circuit includes metal-oxide varistors (MOVs) and associated thermal fuses, and the controller detects whether any of the thermal fuses have opened in response to heat generated by the MOVs.

In one embodiment, the surge protection circuit is provided on a removable circuit board that is detachably connected to a main circuit board, wherein the main circuit board includes power conditioning circuits, a switching device, and the controller, thereby permitting removal and replacement of the surge protection circuit when a component fails.

In one aspect, the present application provides a surge protection device having a ground connection and having input ports for receiving an AC line voltage and a line neutral, and output ports including an AC voltage output port and a neutral output port. The surge protection device also includes a switching device for selectively connecting the AC line voltage to the AC voltage output, wherein the switching device operates in response to a control signal, and a surge protection circuit coupled between AC line voltage, line neutral, and ground for protecting the output ports from transient voltage spikes. The surge protection device also includes a controller having an input for receiving a voltage signal from the surge protection circuit. The voltage signal indicates whether a component in the surge protection circuit has failed. The controller includes an output for supplying the control signal to the switching device based upon the voltage signal from the surge protection circuit. The controller causes the switching device to open in response to failure of the component, thereby disconnecting the AC voltage output from the AC line voltage.

In another aspect the present application provides a line conditioner for receiving AC line power, including AC voltage, AC neutral, and ground connections, and outputting conditioned power through a plurality of AC power outlets. The line conditioner includes two or more power conditioning circuits, each power conditioning circuit including power conditioning elements and a switch for selectively connecting the AC voltage to one of the AC power outlets, wherein the switch operates in response to a control signal. The line conditioner also includes at least one surge protection circuit for each power conditioning circuit. Each surge protection circuit is coupled between AC voltage, AC neutral, and ground for protecting the output ports from transient voltage spikes. Each of the surge protection circuits output a voltage signal indicative of whether a component in the surge protection circuit has failed. The line conditioner also includes a controller having an input for receiving voltage signals from the surge protection circuits. The controller includes an output for supplying the control signal to the switch based upon whether any of the voltage signals indicate failure of one of the components. The control signal causes the switch to disconnect the AC voltage from the output ports in response to failure of one of the components.

In yet a further aspect, the present application provides a surge protection device having a ground connection, input means for receiving a line voltage and a line neutral, and output means for outputting an AC voltage and an AC neutral. The surge protection device also has switch means for selectively connecting the input means to the output means. And surge protection means coupled between line voltage, line neutral, and ground for protecting the output means from transient voltage spikes. The switch means operates in response to a control signal and the surge protection means outputs a voltage signal indicative of a failure in the surge protection means. Controller means are provided for outputting the control signal to the switch means based upon the voltage signal from the surge protection means. The controller means causes the switch means to open in response to failure of the surge protection means, thereby disconnecting the output means from the input means.

In yet another aspect, the present invention provides a line conditioner for receiving AC line power, including AC voltage, AC neutral, and ground connections, and outputting conditioned power through AC power outlets. The line conditioner including a main circuit board, the main circuit board receiving the AC line power and providing AC output power at the AC power outlets. The main circuit board includes a power conditioning circuit. The power conditioning circuit includes a filtering stage, a switching stage, and a controller. The switching stage selectively couples the AC line power to one or more AC power outlets in response to a control signal from the controller. The controller outputs the control signal in response to a voltage signal. The line conditioner also includes a secondary circuit board. The secondary circuit board has a surge protection circuit for absorbing voltage spikes in the AC line power and has an output for the voltage signal, wherein the voltage signal is indicative of failure of the surge protection circuit. The line conditioner includes a detachable connector for connecting the secondary circuit board to the main circuit board and thereby electrically connecting the surge protection circuit to the power conditioning circuit, whereby the detachable connector permits removal and replacement of the secondary circuit board in the event of failure of the surge protection circuit.

In yet a further aspect, the present invention provides a line conditioner for receiving AC line power, including AC voltage, AC neutral, and ground connections, and outputting conditioned power through AC power outlets. The line conditioner includes a main circuit board and a removable circuit board. The main circuit board receives the AC line power and provides AC output power at the AC power outlets, and it includes a power conditioning circuit for filtering and conditioning the AC line power. The removable circuit board has a surge protection circuit for absorbing voltage spikes in the AC line power. The line conditioner also includes a detachable connector for connecting the removable circuit board to the main circuit board and thereby electrically connecting the surge protection circuit to the power conditioning circuit, whereby the detachable connector permits removal and replacement of the removable circuit board in the event of failure of the surge protection circuit.

Other aspects and features of the present application will be apparent to those of ordinary skill in the art from a review of the following detailed description when considered in conjunction with the drawings.

BRIEF DESCRIPTION OF THE DRAWINGS

Reference will now be made, by way of example, to the accompanying drawings which show an embodiment of the present application, and in which.

Similar reference numerals are used in different figures to denote similar components.

DESCRIPTION OF SPECIFIC EMBODIMENTS

Figure 1:
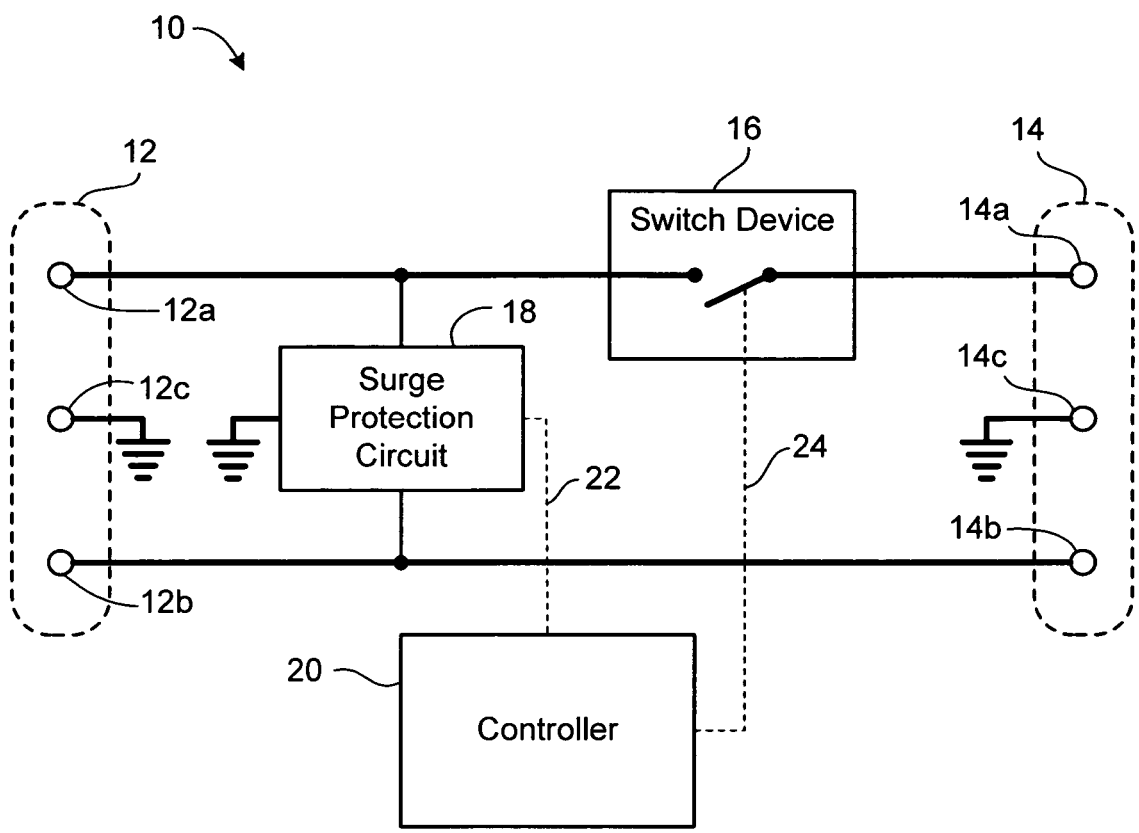
FIG. 1 shows a simplified block diagram of an embodiment of a surge protection system.

Reference is first made to FIG. 1, which shows a simplified block diagram of an embodiment of a surge protection system 10. The surge protection system 10 includes voltage input ports 12 for connecting the system 10 to line voltage and voltage output ports 14 for connecting the system 10 to electronic equipment or other devices to be powered by the voltage supply. The voltage input ports 12 include a high voltage input port 12a, a neutral input port 12b, and a ground port 12c. The voltage output ports 14 include a high voltage output port 14a and neutral output port 14b and a ground port 14c.

The surge protection system 10 includes a switch device 16 coupling the high voltage input port 12a to the high voltage output port 14a. The switch device 16 operates in response to a control signal 24 and, in one embodiment, is a normally-open switch device. In one embodiment, the switch device is a solid state relay. For example, the relay may be a model G8P-1A4P Power PCB relay sold by Omron Electronics, Inc., of Schaumburg, Ill. Other power relays or appropriate power switching devices may alternatively be used.

The surge protection system 10 also includes a surge protection circuit 18 and a controller 20. The surge protection circuit 18 is connected between line voltage, neutral, and ground, i.e. between the high voltage input port 12a, the neutral input port 12b, and the ground port 12c. The surge protection circuit 18 is provided to absorb transient voltage spikes or surges in the voltage levels between the line voltage, neutral, and/or ground. In this regard, the surge protection circuit 18 may includes a number of surge protection or absorption components, such as, for example, metal-oxide varistors (MOVs). MOVs are high impedance devices having a particular voltage threshold. An MOV absorbs any voltage above the threshold, thereby clamping the voltage drop at the threshold level. Absorbed energy is converted to heat. The MOVs' capacity to absorb voltage spikes without overheating diminishes over time, chiefly due to the effects of absorbing previous voltage spikes. If an MOV overheats to a significant degree, it can rupture or burst. Accordingly, a circuit having MOVs also has associated thermal fuses for preventing heat-based rupturing of the MOVs. It will be appreciated that in some embodiments the surge protection circuit 18 includes surge protection or absorption components other than MOVs.

The surge protection circuit 18 includes one or more nodes at which a voltage or current measurement may be taken which will be indicative of the state of the surge protection circuit 18. For example, if the surge protection circuit 18 includes MOVs and thermal fuses then the voltage across one of the MOVs may be indicative of whether an associated thermal fuse remains intact. If the thermal fuse opens, the voltage drop across the associated MOV may disappear. Other circuit configurations may produce other effects or measurements. Accordingly, the surge protection circuit 18 provides one or more measurement signals 22 to the controller 20.

The controller 20 outputs the control signal 24 to the switch device 16 on the basis of the measurement signals 22 received from the surge protection circuit 18. In other words, the controller 20 monitors the surge protection circuit 18 and opens or closes the switch device 16 based upon the state of the surge protection circuit 18. In particular, when the measurement signals 22 indicate the surge protection circuit 18 is operating under normal conditions, then the controller 20 outputs the control signal 24 so as to close the switch device 16, thereby connecting the high voltage input port 12*a* to the high voltage output port 14*a* to supply line voltage to connected electronic devices. If the measurement signals 22 indicate an abnormal condition or hazard in the surge protection circuit 18, i.e. failure of one or more surge protection components, then the controller 20 opens the switch device 16 to disconnect the high voltage output port 14*a* from line voltage, thereby protecting any connected devices. In an embodiment wherein the switch device 16 is a normally open device, the controller 20 de-energizes the switch device 16 to disconnect the high voltage output port 14*a* from line voltage.

Figure 2:
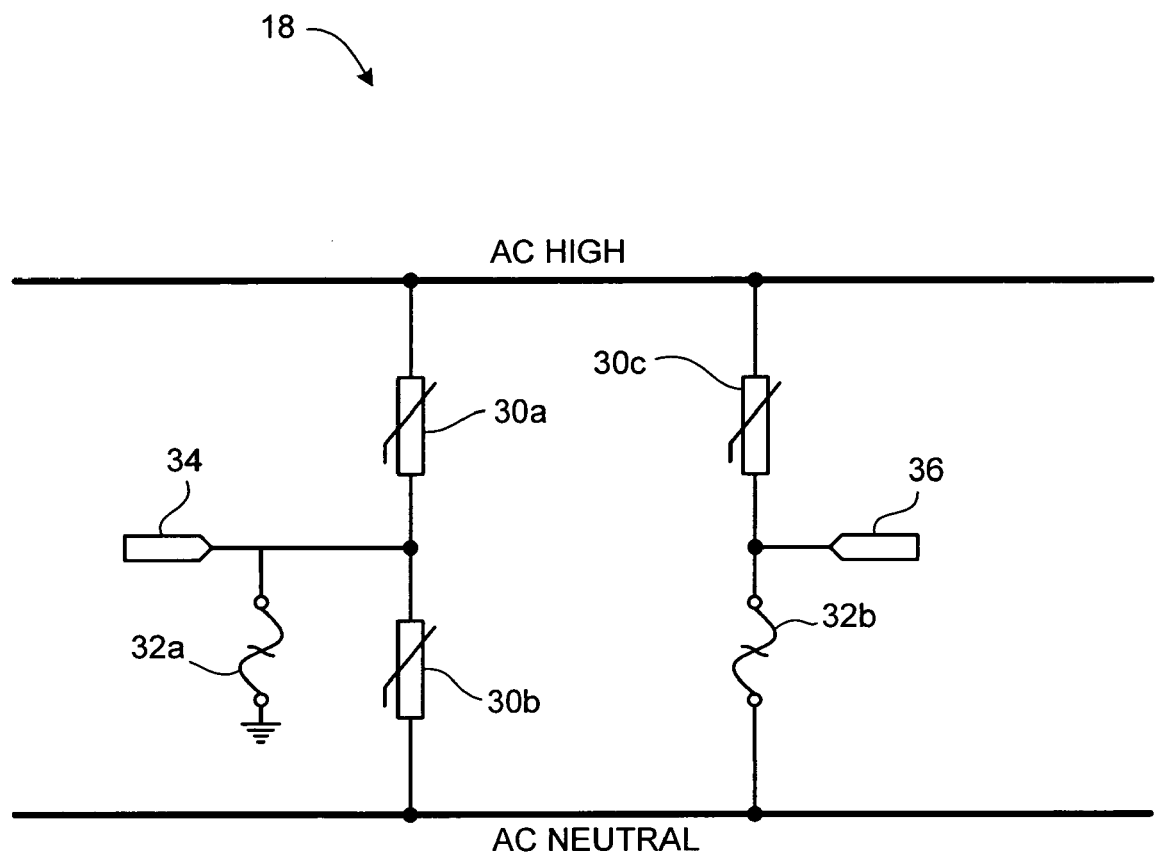
FIG. 2 shows a circuit diagram of an embodiment of the surge protection circuit.

Reference is now made to FIG. 2, which shows a circuit diagram of an embodiment of the surge protection circuit 18. The surge protection circuit 18 includes MOV devices 30 and thermal fuses 32. In particular, the surge protection circuit 18 includes a first MOV 30*a* and a first thermal fuse 32*a* connected in series between AC high and ground. A second MOV 30*b* is connected to the first thermal fuse 32*a* and to AC neutral. A third MOV 30*c* and a second thermal fuse 32*b* are connected in series between AC high and AC neutral.

The first MOV 30*a* is to protect against the occurrence of surges or spikes between the AC high line and ground. The second MOV 30*b* is to prevent surges or spikes from occurring between AC neutral and ground. Protection against voltage surges between AC line or AC neutral and ground is sometime referred to as transverse mode protection. The third MOV 30*c* is to prevent surges or spikes from occurring between AC high and AC neutral, which is sometimes referred to as common mode protection. In one embodiment, the MOVs are selected so as to absorb any voltage surges in excess of about 200 Volts.

If, in the course of absorbing a voltage surge, either the first MOV 30*a* or the second MOV 30*b* becomes overheated beyond a threshold, then the first thermal fuse 32*a* will fail open, disconnecting the MOVs 30*a* and 30*b* from ground. If the third MOV 30*c* overheats beyond the threshold, then the second thermal fuse 32*b* will fail open, decoupling the third MOV 30*c* from its line-to-neutral connection.

The surge protection circuit 18 includes a first measurement point 34 and a second measurement point 36. The first measurement point 34 is for detecting failure of the first thermal fuse 32*a* and the second measurement point 36 is for detecting failure of the second thermal fuse 32*b*. In one embodiment, the first measurement point 34 is used to detect the voltage drop across the first MOV 30*a*. In the event that the first thermal fuse 32*a* fails, the failure will be indicated by the change in the voltage drop across the first MOV 30*a*. In a similar manner, in one embodiment, the second measurement point 36 may be used to detect the voltage drop across the third MOV 30*c*, which is indicative of whether the second thermal fuse 32*b* has failed open. In essence the measurement points 34, 36 provide an indication as to whether any components (i.e. thermal fuses) of the surge protection circuit 18 have failed.

The controller 20 (FIG. 1) may receive measurement signals 22 (FIG. 1) from the first and second measurement points 34, 36 regarding the failure of a component within the surge protection circuit 18. As described above, the controller 20 then controls operation of the switch device 16 (FIG. 1) to disconnect power from the high voltage output port 14*b* (FIG. 1) in response to a detected failure. The first and second measurement points 34, 36 may be coupled to input pins on the controller 20 through appropriate isolation circuitry, as will be described further in embodiments detailed below.

Figure 3A:
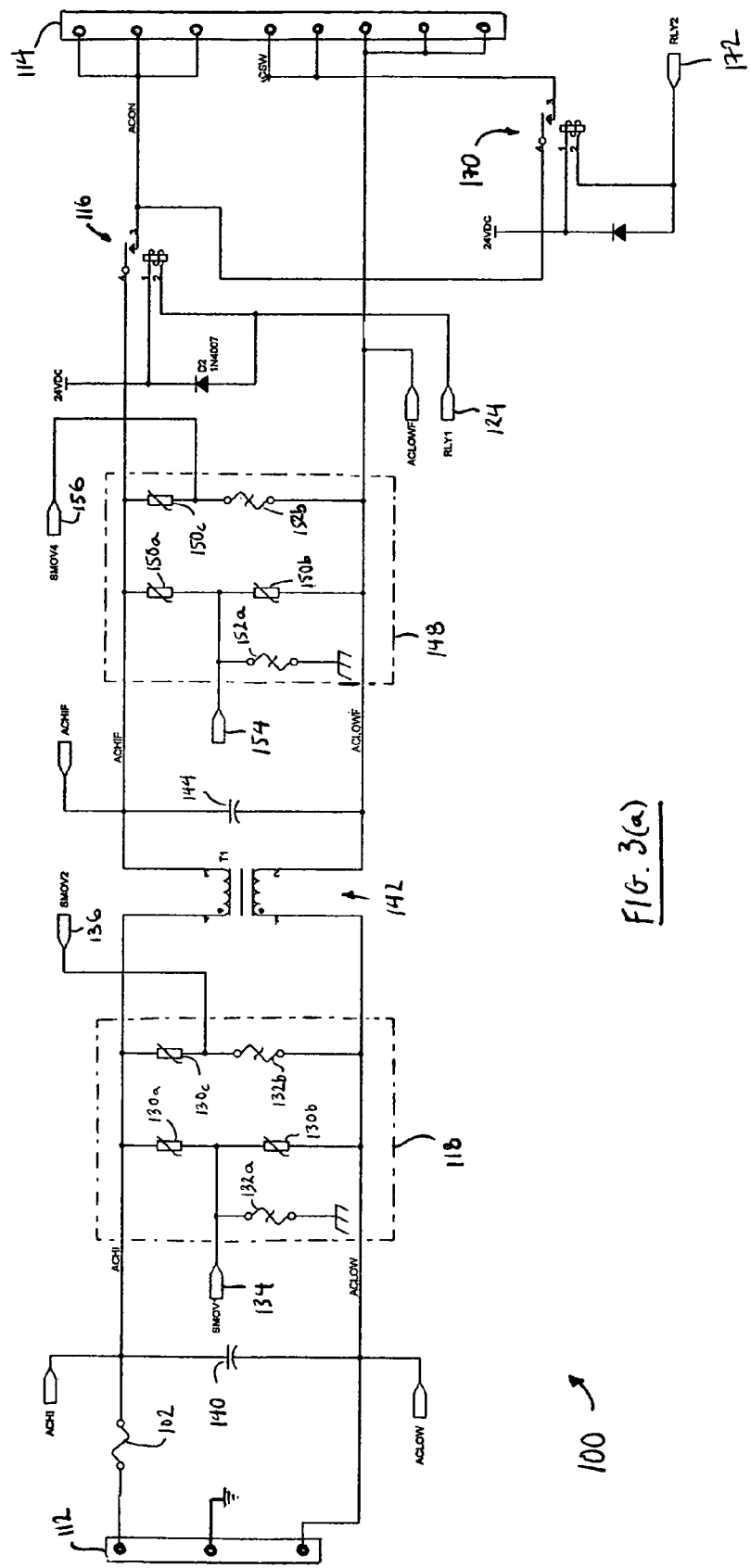
FIGS. 3(a) and 3(b) show a partial circuit diagram of an embodiment of a power strip having a surge protection system.
Figure 3B:
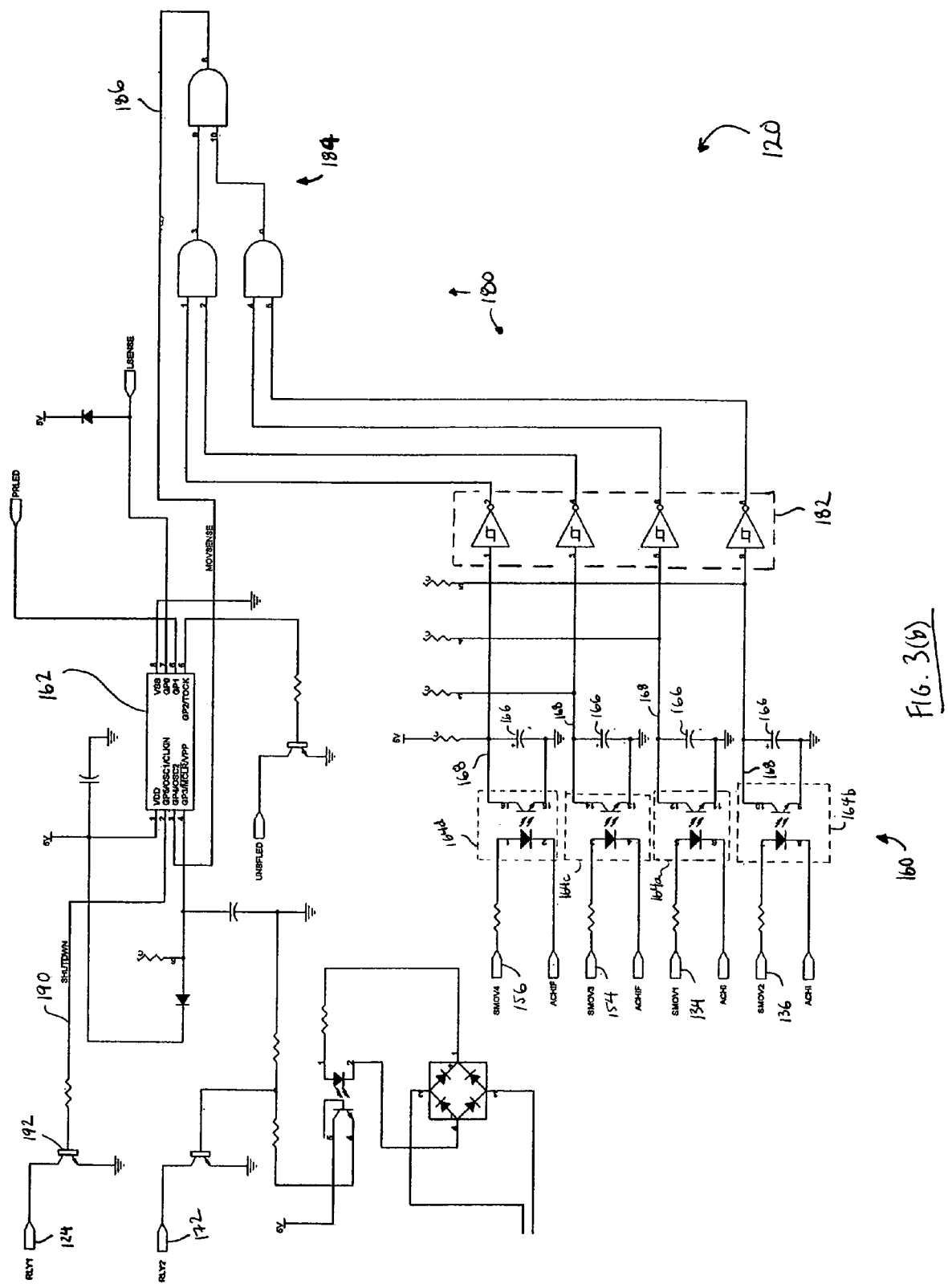

Reference is now made to FIGS. 3(*a*) and 3(*b*), which show a partial circuit diagram of an embodiment of a power strip 100 having a surge protection system. The power strip 100 includes AC inputs 112 and AC outputs 114. The AC inputs 112 include a line or high input, a neutral input and a ground input. The AC inputs 112 may be embodied in a standard three-pronged wall plug intended for connection to a standard grounded power outlet. A 15 A over-current fuse 102 is provided at the high voltage AC input 112, as required by applicable electrical safety standards. A normally-open shutdown relay 116 connects the line voltage to the high voltage AC output 114.

The power strip 100 may include a filter network for filtering or conditioning the input power. The filter network includes a first capacitor 140 connected across line voltage and neutral at the AC inputs 112, a transformer or common mode choke 142, and a second capacitor 144 after the common mode choke 142.

The power strip 100 includes a first surge protection circuit 118 connected between line voltage, neutral, and ground. The power strip 100 may include a redundant or second surge protection circuit 148 for providing additional surge absorption capacity. In one embodiment, the second surge protection circuit 148 may be placed between the filter network and the shutdown relay 116.

The first surge protection circuit 118 includes three varistors 130 (shown individually as 130*a-c*) and two thermal fuses 132*a* and 132*b* configured in the same manner as shown in FIG. 2. The first surge protection circuit 118 includes a first measurement point 134 and a second measurement point 136. Similarly, the second surge protection circuit 148 includes varistors 150, thermal fuses 152, a third measurement point 154, and a fourth measurement point 156.

The power strip 100 further includes a controller 120 coupled to the measurement points 134, 136, 154, and 156 and outputting a control signal 124. The measurement points 134, 136, 154, and 156 provide the controller 120 with information regarding whether any components in the surge protection circuits 118, 148 have failed.

The controller 120 includes a processor 162 and an isolation stage (indicated generally as 160) for obtaining measurement information from the measurement points 134, 136, 154, and 156 and providing isolated measurement inputs to the processor 162. The isolation stage 160 provides appropriate isolation between the high voltage analog circuitry of the power strip 100 and the digital inputs of the processor 162. The processor 162 may operate under stored program control, wherein program instructions are contained in a memory (not shown) connected to or integral with the processor 162. The suitable programming of the processor 162 to execute the functions described herein in response to input data will be understood by those persons of ordinary skill in the art. In one embodiment, the processor 162 is configured to operate as a state-machine and monitors one or more inputs from the isolation stage 160 to determine whether any of the thermal fuses 132, 152 or varistors 130, 150 have failed. In one embodiment, the isolation stage 160 outputs to the processor 162 a single failure signal that indicates by logic level whether any of the monitored components have failed.

In one embodiment, the isolation stage 160 includes an opto-isolator (shown individually as 164*a*-164*d*) for each measurement signal from a measurement point 134, 136, 154, and 156. The opto-isolators 164 each include a light emitting diode (LED) or other photonic device and a corresponding photo-detector. Each opto-isolator is connected to one of the measurement points 134, 136, 154, or 156 and a comparison value, like AC line voltage. For example, measurement point 134 is connected to the inputs of opto-isolator 164a through a current-limiting resistor. The other input to the opto-isolator 164a is connected to AC line voltage. The opto-isolator 164 includes a smoothing capacitor 166 across the photo-detector terminals to remove the 60 Hz flicker. It will be appreciated that if the LED of an opto-isolator 164 transmits sufficient light to bias the photo-detector on, then the photo-detector pulls the output 168 of the opto-isolator to ground. Otherwise, if the photo-detector is not biased on by the LED, the output 168 of the opto-isolator 164a is pulled high by the connection to 5V DC.

The controller 120 further includes a logic stage 180, which includes inverters 182 and an AND gate network 184. In particular, the outputs 168 of the opto-isolators 164 are inverted through the inverters 182 and the inverted outputs are then AND'ed together in the AND gate network 184 to determine whether any of the surge protection circuits 118, 148 have experienced a component failure. The AND gate network 184 produces an output signal 186.

The output 186 of the AND gate network 184 is input to an input pin of the processor 162. The output 186 of the AND gate network 184 provides a logic indication of "normal" or "failure". If the output 186 is normal, then the processor 162 outputs a relay enable signal 190. The relay enable signal 190 is a positive voltage signal for biasing a transistor 192 (or other switching device) into an "on" state, thereby powering the shutdown relay 116, which is connected across 24V DC to the transistor 192. The shutdown relay 116 includes normally-open contacts that are closed when the relay 116 is powered on. If the output 186 indicates that one of the surge protection circuits 118, 148 has failed, then the processor 162 brings the relay enable signal 190 low, thereby turning off the transistor 192 and de-powering the shutdown relay 116 causing it to open.

Operation of the power strip 100 is explained by way of example with reference to varistor 130c and thermal fuse 132b. Under normal operation, the thermal fuse 132b is coupled to AC neutral, meaning that measurement point 136 is at AC neutral. Accordingly, opto-isolator 164b has AC line voltage and AC neutral across the inputs of its LED and currrent-limiting resistor combination. Therefore, under normal conditions current flows at the inputs causing illumination of the LED and causing the photo-detector to conduct. The output 168b is thus pulled to ground, resulting in a low logic output. The low logic output is inverted to a HIGH output by the inverter 182 and is input to the AND network 184. Assuming all other measurement points 134, 154, 156 also indicate normal operation, the inputs to the AND network 184 are all logic HIGH, resulting in an output 186 of logic HIGH. The processor 162 thus powers the relay 116 on to couple AC input voltage to the AC outputs 114.

If varistor 132c absorbs sufficient energy to heat up to more than a threshold value, such as, for example, 95° C., then thermal fuse 132b will open, disconnecting the varistor 132c from AC neutral. As a result, measurement point 134 is left floating, there will be no voltage drop across varistor 132b, and no current will flow in the LED of opto-coupler 164b. With no current flowing in the opto-coupler 164b, the photo-detector is off, meaning that the output 168b is pulled to logic high, i.e. +5V. The inverter 182 inverts the opto-coupler output 168b to produce a logic LOW input to the AND network 184. The logic LOW input causes the AND network 184 to produce a logic LOW output 186, irrespective of the other inputs to the AND network 184. The processor 162 recognizes the logic LOW output 186 as an indication that one of the components of the surge protection circuits 118, 148 has failed. The processor 162 then de-powers the relay 116, causing the contacts to open and disconnecting the AC outputs 114 from the AC inputs 112.

Operation of the power strip 100 is further explained by way of example with reference to varistor 130a and thermal fuse 132a. Under normal operation, the thermal fuse 132a is coupled to ground, meaning that measurement point 134 is at ground. Accordingly, opto-isolator 164a has AC line voltage and ground across the inputs of its LED and currrent-limiting resistor combination. Therefore, under normal conditions current flows at the inputs causing illumination of the LED and causing the photo-detector to conduct and causing the output 168a to be pulled to ground. The low logic output 168a is inverted to a HIGH output by the inverter 182 and is input to the AND network 184. Assuming all other measurement points 136, 154, 156 also indicate normal operation, the inputs to the AND network 184 are all logic HIGH, resulting in an output 186 of logic HIGH. The processor 162 thus powers the relay 116 on to couple AC input voltage to the AC outputs 114.

If varistor 132a absorbs sufficient energy to heat up to more than a threshold value, such as, for example, 95° C., then thermal fuse 132a will open, disconnecting the varistor 132c from ground. As a result, measurement point 134 is left floating and no current will flow in the LED of opto-coupler 164a since no significant voltage drop appears across the varistor 132a. With no current flowing in the opto-coupler 164a, the photo-detector is off, meaning that the output 168a is pulled to logic HIGH. The inverter 182 inverts the opto-coupler output 168a to produce a logic LOW input to the AND network 184. The logic LOW input causes the AND network 184 to produce a logic LOW output 186, irrespective of the other inputs to the AND network 184. The processor 162 recognizes the logic LOW output 186 as an indication that one of the components of the surge protection circuits 118, 148 has failed. The processor 162 then de-powers the relay 116, causing the contacts to open and disconnecting the AC outputs 114 from the AC inputs 112.

The processor 162 may also output signals for powering or de-powering indicator lights, like LEDs, for indicating a fault-condition, normal operation, etc.

In one embodiment, the power strip 100 may include more than one set of output receptacles (i.e. AC outputs 114) so that more than one device may be plugged into the power strip 100. In yet another embodiment, one or more receptacles may be designed to respond to an external trigger signal. In this embodiment, a second-relay 170 is provided in-line with the shutdown relay 116 high voltage output and the designated high voltage AC output 114. The second relay 170 responds to a second control signal 172 from the processor 162. The processor 162 provides the second control signal 172 on the basis of an external trigger input 174. The external trigger input 174 may be used to trigger power to an electronic device in response to the state of another electronic device. For example, a video projector may produce a trigger signal when first powered on that may be used as the external trigger input 174. A corresponding device, like the power motor for lowering a projection screen, may be plugged into the externally triggered outlets. In this manner, the screen may be lowered automatically when the projector is powered on.

A further aspect of the power strip 100, aside from surge protection, may be an under-voltage and over-voltage protection mechanism. This mechanism may be used to protect devices from AC voltage that has deviated significantly from its specified RMS setting, but that is not necessarily undergoing a surge or spike. For example, in North America household power is typically provided at 60 Hz 120 Vac ($V_{RMS}$).

The peak AC voltage may be ±170 V. The surge protection circuits 118, 148 may serve to protect against surges beyond 200 Volts. An over-voltage or under-voltage mechanism may be provided to prevent the RMS voltage from exceeding about 136 Volts or dropping below 90 Volts. Beyond these RMS voltages, various pieces of equipment may experience malfunctions.

Figure 5:
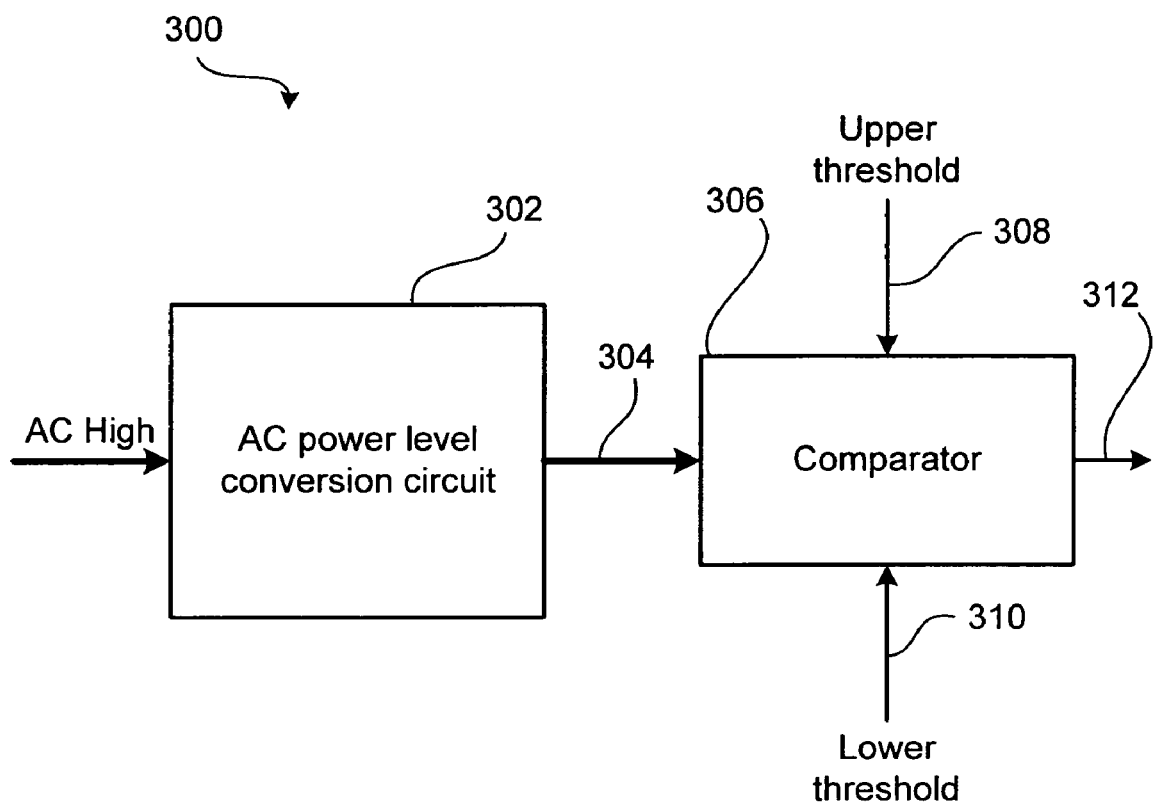
FIG. 5 shows, in block diagram form, an over-voltage and under-voltage protection circuit.

Reference is now made to FIG. 5, which shows, in block diagram form, an over-voltage and under-voltage protection circuit 300. The protection circuit 300 may include an AC power level conversion circuit 302. In essence, the AC power level conversion circuit 302 converts the AC input line voltage to a DC output level corresponding proportionally to the level of the rectified input AC. For example, the output 304 may be configured, through appropriate capacitive filtering and passive voltage division, to be 3 $V_{DC}$ at 120 Vac. Increases in the voltage of the AC input would be reflected in a corresponding increase in the output 304 above 3 $V_{DC}$, and decreases in the AC input voltage are reflected in a corresponding decrease in the output 304 below 3 $V_{DC}$. Accordingly, the output 304 provides a DC signal representative of the voltage level of the AC input line voltage.

The protection circuit 300 includes a comparator 306 that receives the DC output 304 from the conversion circuit 302. In one embodiment, the comparator 306 includes an analog-to-digital converter for digitizing the DC output 304 and comparing it to preset thresholds. In one embodiment, the comparator 306 also receives a preset high DC input 308 and a preset low DC input 310 which are digitized to provide the threshold values. The high DC input 308 and low DC input 310 correspond to the upper and lower boundaries of the acceptable range of variation in the AC input voltage level. The comparator 306 determines whether the DC output 304 from the conversion circuit 302 falls between the high DC input 308 and the low DC input 310. The comparator 306 outputs a level indicator signal 312, which indicates whether the DC output 304 from the conversion circuit 302 falls between the high DC input 308 and the low DC input 310. Accordingly, the level indicator signal 312 indicates whether the AC input voltage is over an upper threshold or below a lower threshold, i.e. whether the AC input voltage is in an over-voltage or under-voltage state.

The level indicator signal 312 is input to the processor 162 (FIG. 3), which then bases its output of the relay enable signal 190 (FIG. 3) on the status of the level indicator signal 312. If the level indicator signal 312 indicates that the AC line voltage is within the acceptable range, then the processor 162 enables power to the shutdown relay 116 (FIG. 3), assuming that no failures are indicated by the surge protection circuits 118, 148 (FIG. 3). If the level indicator signal 312 indicates an over-voltage or under-voltage condition, then the processor 162 disables power to the relay 116, thereby disconnecting AC power from the AC outputs 114 (FIG. 3).

Those of ordinary skill in the art will appreciate that the determination of the voltage level of AC inputs and the comparison of this level with upper and lower threshold levels may be implemented in a variety of manners. For example, in one embodiment the comparator may be an integrated device separate from the processor 162. In another embodiment, the comparator 306 may be implemented within the processor 162 by suitable firmware. Other embodiments for detecting over-voltage or under-voltage conditions will be apparent to those of ordinary skill in the art.

It will be appreciated that if power to the relay 116 is interrupted on the basis of an over-voltage or under-voltage condition, then it may be restored when the condition is resolved. In other words, the power strip 100 may continue to monitor the incoming AC line voltage to determine if the over-voltage or under-voltage condition persists. Conversely, if one of the surge protection circuits 118, 148 indicates a faulty component, the processor 162 will not restore power to the relay 116 until a reset procedure is undertaken. The faulty component must be replaced before the power strip 100 may be permitted to operate normally again.

Those of ordinary skill in the art will appreciate that the embodiment of the controller 120 described above may be implemented in a number of ways to achieve the same functional result. In one embodiment, the controller 120 includes a programmable microcontroller. In another embodiment, the controller 120 includes discrete components for triggering the shutdown relay 116 in response to a detected failure instead of the digital components, like the processor 162, described above. Variations will be understood by persons of ordinary skill in the art having regard to this description.

Those persons of ordinary skill in the art will further appreciate that the power strip 100 may incorporate additional or alternative filtering elements for conditioning and cleaning up the line power. In some cases, an isolation transformer may be provided in circumstances where the AC outputs are likely to be used for digital electronics equipment. In some cases, a high current filter network may be used where the AC outlet is designed for use by equipment requiring high current power supply, such as a stereo amplifier. Other such variations and modifications will be understood by those ordinarily skilled in the art.

In one embodiment, a line conditioner unit is provided that incorporates a number of variations to provide outlets specifically for distinct usage. For example, one set of outlets may be for ordinary analog equipment. One set may be for digital equipment and may be connected through an isolation transformer. Yet another set of outlets may be configured so as to provide a high current power source for high current equipment.

Figure 4:
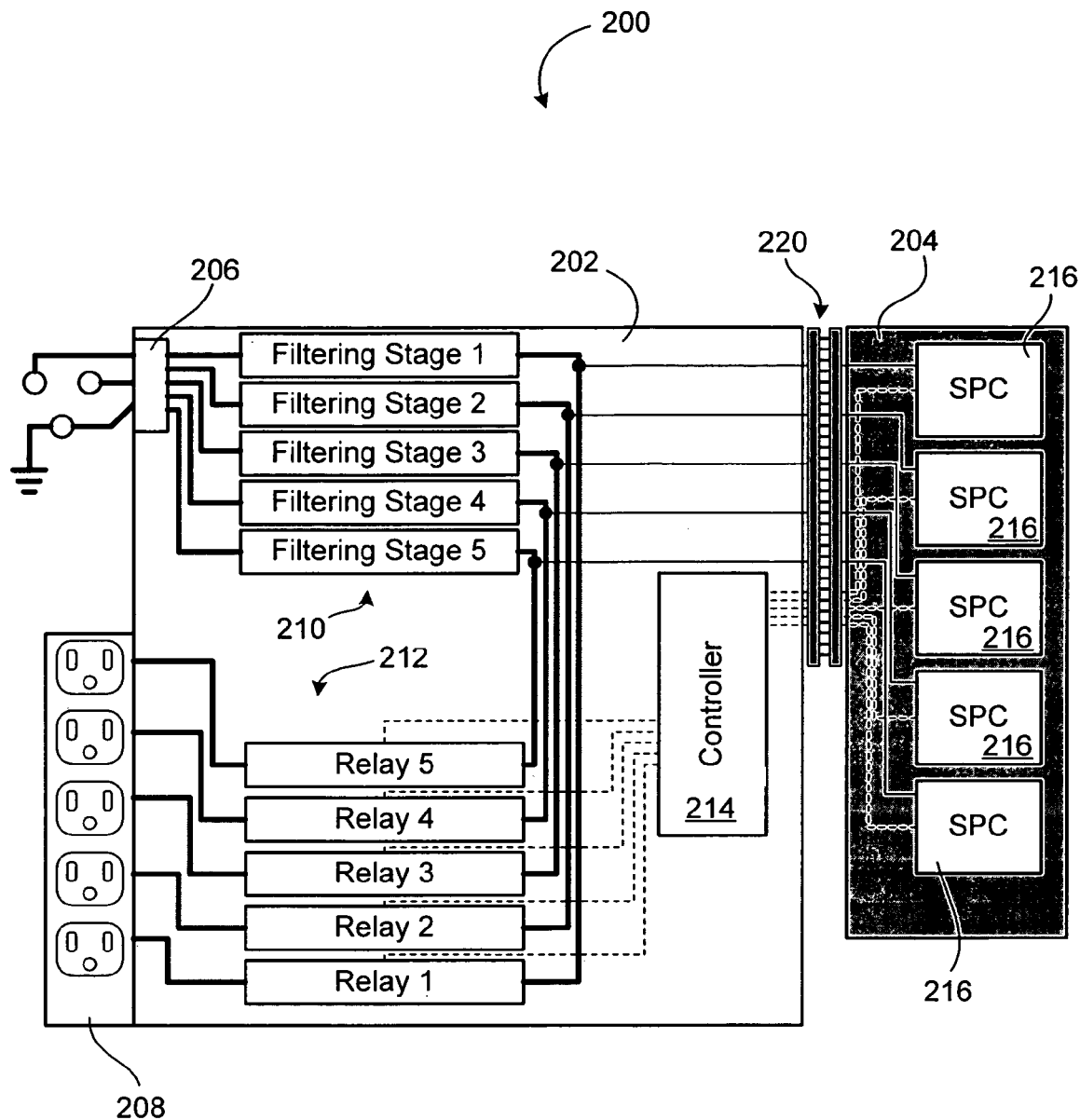
FIG. 4 shows a block diagram of a line conditioner.

Reference is now made to FIG. 4, which shows a block diagram of a line conditioner 200. The line conditioner 200 includes a main circuit board 202 and a removable circuit board 204. The main circuit board 202 includes an input connector 206 for receiving input line voltage, neutral, and ground connections. It also includes a plurality of output connectors 208 for supplying output AC high, neutral, and ground connections. In this embodiment, the output connectors 208 provide for five separate output power circuits. In some embodiments each output power circuit may provide for two receptacles, meaning that the line conditioner 200 may feature ten output power receptacles. It will be appreciated that the line conditioner 200 may have more or fewer power circuits and more or fewer output power receptacles. The output power receptacles are provided in conjunction with a housing (not shown) for the line conditioner 200. The housing also contains the circuit boards 202, 204.

The main circuit board 202 includes a filtering stage 210 for each power circuit, a relay stage 212 for each power circuit and a one or more controllers for controlling operation of the relay stages 212. The filtering stage 210 may include various power filtering or conditioning elements, and in some cases may include isolation transformers, common mode chokes, capacitive filtering, and other such elements.

The removable circuit board 204 includes a surge protection circuit 218 for each power circuit on the main circuit board 204. Electrical connections between each surge protection circuit 218 and its corresponding line voltage, neutral, and ground connections on the main circuit board 202 are by way of a detachable connector 220. Although FIG. 4 illustrates the surge protection circuit 218 as being connected to line, neutral, and ground traces between the filtering stage 202 and the relay stage 204, it will be appreciated that the surge protection circuits 218 may be connected before the filtering stage 202, or at points within the filtering stage 202, as was shown in FIG. 3(a).

The detachable connector 220 may include various PCB-mounted board-to-board connectors such that the boards 202 and 204 may be attached and detached easily. In some cases, conventional electronic board-to-board connectors may not provide sufficient pin-to-pin spacing to comply with standards regulations in view of the power levels. Accordingly, in one embodiment, the board-to-board detachable connector 220 includes a set of terminal blocks and screws. In this embodiment, the removable board 204 is placed over of the main circuit board 202 such that the corresponding screws are aligned with the appropriate terminal blocks and the screws and screwed into place to secure the removable board 204. The removable board 204 may then be detached by unscrewing it from the terminal blocks.

Providing the surge protection circuitry on the removable circuit board 204 that is easily detached from the main circuit board 202 facilitates replacement of the removable circuit board 204 when a thermal fuse fails due to overheating of an MOV. By replacing the surge protection circuitry only, the expense of repairing the line conditioner 200 is minimized.

The teachings of the present application may be embodied in other specific forms without departing from the spirit or essential characteristics thereof. Certain adaptations and modifications will be obvious to those skilled in the art. The above discussed embodiments are considered to be illustrative and not restrictive.

What is claimed is:

1. A surge protection device having a ground connection, comprising: input ports for receiving an AC line voltage and a line neutral;
   output ports including an AC voltage output port and a neutral output port;
   a switching device selectively connecting the AC line voltage to the AC voltage output port, wherein said switching device operates in response to a control signal;
   a surge protection circuit coupled between AC line voltage, line neutral, and ground for protecting said output ports from transient voltage spikes comprising one or more voltage limiting devices and one or more associated thermal fuses for protecting said voltage limiting devices against excessive heat generation, and wherein said voltage signal indicates whether one of said thermal fuses has opened; and
   a controller having an input for receiving a voltage signal from said surge protection circuit wherein the voltage signal indicates whether a component in said surge protection circuit has failed, and wherein said controller includes an output for supplying the control signal to said switching device based upon the voltage signal from said surge protection circuit, whereby said controller causes said switching device to open in response to failure of said component, thereby disconnecting the AC voltage output port from the AC line voltage.

2. The surge protection device claimed in claim 1, wherein said switching device comprises a power-rated relay.

3. The surge protection device claimed in claim 2, wherein said power-rated relay comprises a normally-open relay and wherein the control signal causes said normally-open relay to be energized and close when the voltage signal indicates that said surge protection circuit is functioning normally, and wherein the control signal causes said normally-open relay to be de-energized and open when the voltage signal indicates that said component in said surge protection circuit has failed.

4. The surge protection device claimed in claim 1, wherein said surge protection circuit comprises a first metal-oxide varistor (MOV) connected in series with a first thermal fuse between line voltage and ground, a second MOV connected in series with said first thermal fuse between line neutral and ground, and a third MOV connected in series with a second thermal fuse between line voltage and line neutral.

5. The surge protection circuit claimed in claim 4, wherein said voltage signal comprises a voltage measurement across at least one of said MOVs.

6. The surge protection circuit claimed in claim 5, wherein said controller includes an isolation stage, a logic stage, and a microprocessor, and wherein said logic stage outputs a result signal to said microprocessor, said result signal indicating whether any the components of the surge protection circuit have failed.

7. The surge protection device claimed in claim 1, wherein said controller comprises an opto-isolator and a microprocessor.

8. A line conditioner for receiving AC line power, including AC voltage, AC neutral, and ground connections, and outputting conditioned power through a plurality of AC power outlets, the line conditioner comprising:
   two or more power conditioning circuits, each power conditioning circuit including power conditioning elements and a switch for selectively connecting the AC voltage to one of the AC power outlets, wherein said switch operates in response to a control signal;
   at least one surge protection circuit for each power conditioning circuit and coupled between AC voltage, AC neutral, and ground for protecting said output ports from transient voltage spikes, each of said surge protection circuits outputting a voltage signal indicative of whether a component in said surge protection circuit has failed comprising one or more voltage limiting devices and one or more associated thermal fuses for protecting said voltage limiting devices against excessive heat generation, and wherein said voltage signal indicates whether one of said thermal fuses has opened; and
   a controller having inputs for receiving voltage signals from said surge protection circuits, and wherein said controller includes an output for supplying the control signal to said switch based upon whether any of said voltage signals indicate failure of one of said components,
   whereby said control signal causes said switch to disconnect the AC voltage from the output ports in response to failure of one of said components.

9. The line conditioner claimed in claim 8, wherein said switch comprises a power-rated relay.

10. The line conditioner claimed in claim 1, wherein said voltage limiting devices comprise metal-oxide varistors (MOV) and wherein each of said surge protection circuits comprises a first metal-oxide varistor (MOV) connected in series with a first thermal fuse between AC voltage and ground, a second MOV connected in series with said first thermal fuse between AC neutral and ground, and a third MOV connected in series with a second thermal fuse between AC voltage and AC neutral.

11. The line conditioner claimed in claim 10, wherein said controller includes an isolation stage, a logic stage, and a microprocessor, and wherein said logic stage outputs a result signal to said microprocessor, said result signal indicating whether any of said components of said surge protection circuits have failed.

12. The line conditioner claimed in claim 8, wherein said controller comprises an opto-isolator and a microprocessor.

13. The line conditioner claimed in claim 8, further comprising a first circuit board, a second circuit board, and a circuit connector, and wherein said power conditioning circuits and said controller are disposed upon said first circuit board, and said surge protection circuits are disposed on said second circuit board, and wherein said circuit connector detachably electrically connects said first circuit board to said second circuit board.

14. The line conditioner claimed in claim 13, wherein said circuit connector comprises a plurality of terminal blocks and screws.

15. A surge protection device having a ground connection, comprising:
- input means for receiving a line voltage and a line neutral;
- output means for outputting an AC voltage and an AC neutral;
- switch means for selectively connecting the input means to the output means, wherein said switch means operates in response to a control signal;
- surge protection means coupled between line voltage, line neutral, and ground for protecting said output means from transient voltage spikes, wherein said surge protection means outputs a voltage signal indicative of a failure in said surge protection means including means for absorbing voltage spikes above a threshold and converting excess energy into heat, and means for determining whether said heat exceeds a preset level; and
- controller means for outputting the control signal to said switch means based upon the voltage signal from said surge protection means, and wherein said controller means causes said switch means to open in response to failure of said surge protection means, thereby disconnecting the output means from the input means.

16. A line conditioner for receiving AC line power, including AC voltage, AC neutral, and ground connections, and outputting conditioned power through AC power outlets, the line conditioner comprising:
- a main circuit board, said main circuit board receiving the AC line power and providing AC output voltage at the AC power outlets, said main circuit board including a power conditioning circuit, said power conditioning circuit including a filtering stage, a switching stage, and a controller, the switching stage selectively coupling the AC line power to one or more AC power outlets in response to a control signal from said controller, said controller outputting said control signal in response to a voltage signal;
- a secondary circuit board, said secondary circuit board having a surge protection circuit for absorbing voltage spikes in said AC line power and having an output for said voltage signal, wherein said voltage signal is indicative of failure of said surge protection circuit and wherein said surge protection circuit comprises a first metal-oxide varistor (MOV) connected in series with a first thermal fuse between AC voltage and ground, a second MOV connected in series with said first thermal fuse between AC neutral and ground, and a third MOV connected in series with a second thermal fuse between AC voltage and AC neutral; and
- a detachable connector for connecting said secondary circuit board to said main circuit board and thereby electrically connecting said surge protection circuit to said power conditioning circuit, whereby said detachable connector permits removal and replacement of said secondary circuit board in the event of failure of said surge protection circuit.

17. The line conditioner claimed in claim 16, wherein said power conditioning circuit comprises two or more power conditioning circuits, each having a dedicated filtering stage and a dedicated switching stage, and sharing said controller, and wherein said surge protection circuit comprises at least one surge protection circuit associated with each of said power conditioning circuits.

18. The line conditioner claimed in claim 17, wherein at least one of said dedicated filtering stages includes an isolation transformer.

19. The line conditioner claimed in claim 16, wherein said detachable connector comprises a plurality of terminal blocks and screws.

20. The line conditioner claimed in claim 16, wherein said switching stage comprises a power-rated relay.

21. The line conditioner claimed in claim 16, wherein said voltage signal indicates failure of at least one of said thermal-fuses.

22. A line conditioner for receiving AC line power, including AC voltage, AC neutral, and ground connections, and outputting conditioned power through AC power outlets, the line conditioner comprising:
- a main circuit board, said main circuit board receiving the AC line power and providing AC output voltage at the AC power outlets, said main circuit board including a power conditioning circuit for filtering and conditioning the AC line power;
- a secondary circuit board, said secondary circuit board having a surge protection circuit for absorbing voltage spikes in said AC line power comprising a first metal-oxide varistor (MOV) connected in series with a first thermal fuse between AC voltage and ground, a second MOV connected in series with said first thermal fuse between AC neutral and ground, and a third MOV connected in series with a second thermal fuse between AC voltage and AC neutral; and
- a detachable connector for connecting said secondary circuit board to said main circuit board and thereby electrically connecting said surge protection circuit to said power conditioning circuit, whereby said detachable connector permits removal and replacement of said secondary circuit board in the event of failure of said surge protection circuit.

23. The line conditioner claimed in claim 22, wherein said detachable connector comprises a plurality of terminal blocks and screws.

* * * * *